United States Patent [19]
Pfeil et al.

[11] Patent Number: 5,925,725
[45] Date of Patent: *Jul. 20, 1999

[54] EMULSIFIER FROM CONDENSING POLYETHER POLYOL(S) AND POLYEPOXIDE

[75] Inventors: Armin Pfeil, Kaufering; Dieter Dreischhoff, Wiesbaden; Stefan Petri, Taunusstein; Claus Godau, Kiedrich, all of Germany

[73] Assignee: Vianova Resins GmbH, Mainz-Kastel, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/718,983

[22] Filed: Sep. 26, 1996

[30] Foreign Application Priority Data

Sep. 30, 1995 [DE] Germany ............ 195 36 608

[51] Int. Cl.$^6$ ............ C08G 59/14; C08L 3/20
[52] U.S. Cl. ............ 528/110; 523/402; 523/403; 525/480
[58] Field of Search ............ 523/402, 403; 528/110; 525/480

[56] References Cited

U.S. PATENT DOCUMENTS

| | | | |
|---|---|---|---|
| 3,870,666 | 3/1975 | Becker | 260/21 |
| 4,122,067 | 10/1978 | Anderson | 528/89 |
| 4,197,389 | 4/1980 | Becker et al. | 528/103 |
| 4,315,044 | 2/1982 | Elmore et al. | 427/386 |
| 4,886,845 | 12/1989 | Becker et al. | 523/403 |
| 5,236,974 | 8/1993 | Dreischoff et al. | 523/403 |
| 5,344,856 | 9/1994 | Klein | 523/403 |
| 5,415,689 | 5/1995 | Wekenmann et al. | 106/14.15 |
| 5,459,180 | 10/1995 | Pfeil et al. | 523/403 |

FOREIGN PATENT DOCUMENTS 747413 12/1996 European Pat. Off. .
27 26 269 12/1978 Germany .

*Primary Examiner*—Robert E. Sellers
*Attorney, Agent, or Firm*—Foley & Lardner

[57] ABSTRACT

An emulsifier composition for water-dilutable epoxy resins comprise condensation products of an aliphatic polyol component having a weight-average molar mass ($M_w$) of from 200 to 20,000 g/mol, where a mass fraction of at least 5%, has a weight-average molar mass ($M_w$) of at least 4000 g/mol, and an epoxide component having of at least one epoxide compound having at least two epoxide groups per molecule and an epoxide group content of from 500 to 10,000 mmol/kg, the ratio of the number of hydroxyl groups to that of the epoxide groups (OH):(EP) being from 1:3.51 to 1:10. When the emulsifier is used for the preparation of aqueous epoxy resin systems, the end of the pot life is indicated by a sharp rise in viscosity.

17 Claims, No Drawings

EMULSIFIER FROM CONDENSING POLYETHER POLYOL(S) AND POLYEPOXIDE

BACKGROUND OF THE INVENTION

Water-dilutable epoxy resin systems have become increasingly important among the cold-curing aqueous coating compositions ("aqueous lacquers"). These two-component (or two-part) systems exhibit outstanding properties in comparison with one-component (or one-part) waterborne coating materials. The following positive properties deserve emphasis: low or zero organic solvent content, absence of fire hazard, little or no odor pollution, ease of processing, low sensitivity to wet substrates, good drying and rapid through-curing, excellent adhesion to the majority of substrates, very good intercoat adhesion, good corrosion protection on metals, and ease of cleaning of equipment directly after use.

In general, suitable binders for water-dilutable epoxy systems are liquid epoxy resins, which may also include emulsifiers, resins diluted with reactive diluents, and solid-resin dispersions. In the case of liquid resins, use is often made of mixtures of epoxy resins based on bisphenol A and F (A/F resin mixtures) in order to reduce the crystallization tendency. If the liquid resin is to be self-emulsifying, then it is necessary to use an emulsifier which advantageously is nonionic (having a hydrophilic-lipophilic balance (HLB) >16) in order to convert the highly hydrophobic epoxy resin (HLB<1) to the aqueous, continuous phase.

To some extent this objective can also be achieved by water-dilutable hardeners which themselves have emulsifying properties. Unmodified A/F resin mixtures are not self-emulsifying and are only water-dilutable in combination with aqueous hardeners, which are described, for example, in EP-A 0 000 605. Such systems provide very good corrosion protection.

Externally emulsified systems are widely known from the prior art (e.g., DE-A 27 26 269, EP-A 0 491 550, DE-A 41 37 590). Thus, for example, A/F liquid resins diluted with reactive diluents are employed in combination with nonionic emulsifiers. These externally emulsified resins, although having fairly good properties overall, give coatings whose corrosion protection effect is poorer than that of the above-mentioned systems owing to the content of hydrophilic emulsifiers.

For epoxy resins, specific emulsifiers are known which are obtained by condensation of diglycidyl compounds with polyoxyalkylenediols. These systems have proven themselves, for example, in the production of aqueous epoxy solid-resin dispersions. For instance, U.S. Pat. No. 4,122,067 is a patent describing an emulsifier system which is obtained by condensation of diglycidyl ethers with polyethylene glycols, the ratio of the number of OH groups (OH) to the number of epoxide groups (EP) being from 1:0.5 to 1:0.833. It therefore relates exclusively to OH-functional emulsifiers. EP-A 0 272 595 demonstrates the technical advance of a comparable emulsifier system ((OH):(EP)= 1:0.85 to 1:3.5), which requires the use of specific catalysts in the condensation reaction. Here, the OH-functional and EP-functional systems are described.

EP-A 0 000 605 describes analogous systems which have a z(OH):z(EP) ratio of between 1:1.333 and 1:4, but which are used for the hydrophilization of modified polyamines in order to obtain water-dilutable epoxy hardeners.

EP-A 0 618 245 describes an emulsifier system based on condensation products of an aliphatic polyol having a weight-average molar mass ($M_w$) of from 200 to 20,000 g/mol and an epoxide compound having at least two epoxide groups per molecule and an epoxide group content of from 500 to 10,000 mmol/kg ("epoxide equivalent weight"=molar mass divided by the average number of epoxide groups per molecule, of from 100 to 2000 g/mol), the ratio of the number of OH groups to the number of EP groups z(OH):z(EP) being from 1:3.51 to 1:10, preferably from 1:4 to 1:8, and the epoxide group content of these condensation products being from 100 to 7000 mmol/kg, preferably from 1000 to 4000 mmol/kg (the epoxide equivalent weight is between about 150 g/mol and 8000 g/mol, preferably between 250 g/mol and 1000 g/mol).

In that patent it was found that these compounds of increased epoxide group content, which therefore exhibit epoxide functionality, are outstandingly suited for use as a nonionic emulsifier in water-dilutable epoxy liquid-resin systems.

The water-dilutable liquid resins formulated with this emulsifier system, like all other such resins disclosed to date, have the substantial defect that, in combination with the majority of commercially available amino-functional aqueous hardeners, they do not indicate the end of the pot life. However, the user is accustomed, from the conventional, i.e., solvent-free or solvent-containing systems, to the fact that after blending the two-component system there is a marked increase in the viscosity toward the end of the pot life (processing time), thereby indicating this life in a markedly perceptible manner. By this means the application of a system which has already reacted is avoided.

In the case of aqueous epoxy systems, in contrast, it is possible only with liquid resins in combination with a few aqueous hardeners to observe a rise in viscosity which appears at the correct time prior to the end of the useful life.

It has so far not been possible to indicate the end of the pot life with epoxy solid-resin dispersions. Even with the dispersions which are otherwise outstandingly suitable for cold-curing two-component systems, such as those described in DE-C 36 43 751 and in DE-A 41 28 487, for example, the lack of pot life indication is seen as a defect.

SUMMARY OF THE INVENTION

It is, therefore, an object of the present invention to provide improved emulsifier compositions for producing water-dilutable epoxy systems.

A further object of the invention is to provide water-dilutable epoxy systems which per se—in other words independently of the hardener used—indicate the pot life.

It is also an object of the invention to provide coatings and coated articles produced from the aqueous epoxy systems according to the invention.

In accomplishing the foregoing objects, there has been provided according to one aspect of the present invention an emulsifier composition for water-dilutable epoxy resin compositions, comprising a condensation product of:

(A) an aliphatic polyol component having a weight-average molar mass ($M_w$) of from 200 to 20,000 g/mol, where a mass fraction of at least 5%, preferably more than 15%, particularly preferably more than 25%, has a weight-average molar mass ($M_w$) of at least 4000 g/mol, and (B) an epoxide component comprising at least one epoxide compound having at least two epoxide groups per molecule and an epoxide group content of from 500 to 10,000 mmol/kg (epoxide equivalent weight of from 100 to 2000 g/mol), the ratio of the number of OH groups to that of the EP groups (OH):(EP) being from 1:3.51 to 1:10, preferably from 1:4 to 1:8. When used as an emulsifier for the preparation of aqueous epoxy resin systems, the epoxy resin compositions indicate the end of the pot life by a sharp rise in viscosity.

In accordance with another aspect of the present invention, there has been provided an epoxy resin dispersion comprising a water-dilutable epoxy resin; an emulsifier as set forth above; and an amine-type curing agent, the curing agent being added in a quantity such that the number of epoxide groups (EP) and the number of amine hydrogen atoms (H) are in a ratio of from 1:0.75 to 1:2.

In accordance with still another aspect of the invention, there has been provided a coated article comprising a substrate and a coating thereon produced from the epoxy resin compositions defined above.

Further objects, features and advantages of the present invention will become apparent from the detailed description of preferred embodiments which follows.

DETAILED DESCRIPTION OF PREFERRED EMBODIMENTS

Surprisingly, the objectives of the invention are achieved for both water-dilutable liquid epoxy resins and epoxy-solid resin dispersions if emulsifiers in accordance with EP-A 0 618 245 are used but, in addition, a certain proportion at least of the emulsifier system is based on high molar mass aliphatic polyols.

The aliphatic polyols (A) are preferably polyetherpolyols (polyoxyalkylene glycols) having weight-average molar masses ($M_w$; determined by gel permeation chromatography based on a polystyrene standard) of preferably between 200 and 20,000 g/mol, in particular from 1000 to 10,000 g/mol, and OH numbers (the mass of KOH, in mg, which has the same number of hydroxyl groups as 1 g of the solid resin, based on this mass of the solid resin) of expediently from 5 to 600 mg/g, preferably from 10 to 100 mg/g. These polyetherpolyols preferably possess only terminal, primary OH groups. Examples which may be mentioned here are block copolymers of ethylene oxide and propylene oxide having hydroxyl end groups, and polyethylene, polypropylene and polybutylene glycols. The use of mixtures of the respective polyalkylene glycols is also possible. Polyethylene glycols are preferably used.

In the context of the invention, however, is also possible to replace some of these polyols, preferably up to 30%, particularly preferably up to 10% of their mass, by predominantly aliphatic polyesterpolyols or other predominantly aliphatic polycondensation products having hydroxyl end groups. Examples of suitable compounds are aliphatic polyesterpolyols of aliphatic dicarboxylic acids and aliphatic diols, in which case up to 50% of the aliphatic dicarboxylic acids can be replaced by aromatic dicarboxylic acids, and also polycarbonatepolyols, polyamidepolyols and polyesteramidepolyols. These compounds are preferably prepared by condensation of dicarboxylic acids having 3 to 40 carbon atoms, diols having two to 20 carbon atoms, primary diamines or polyalkylenepolyamines or amino alcohols having 2 to 40 carbon atoms, in each case with the appropriate reactants.

For the present invention it is important, in order to achieve pot life indication by a rise in viscosity, to employ polyols (A) of high molar mass, in which context the average molar mass can be tailored by the use of appropriate mixtures of the polyols or of the condensation products. Preferably, suitable polyol mixtures (A) are reacted with the epoxide component (B) in order to produce uniform emulsifiers. These condensation products can also be added to commercially available, water-dilutable epoxy resins in order to transform systems with no pot life indication into systems with pot life indication.

The epoxide compounds according to (B) preferably have a specific epoxide group content of from 500 to 10,000 mmol/kg, in particular from 1000 to 6700 mmol/kg (epoxide equivalent weight of from 100 to 2000, in particular from 150 to 1000 g/mol). These polyepoxides are compounds having on average at least two epoxide groups per molecule. These epoxide compounds can be either saturated or unsaturated and can be aliphatic, cycloaliphatic, aromatic and/or heterocyclic and can also have hydroxyl groups. They may additionally comprise those substituents and/or functional groups which under the conditions of mixing or reaction do not give rise to any disruptive side reactions, examples being alkyl or aryl substituents, ether groups and the like.

These epoxide compounds are preferably polyglycidyl ethers based on polyhydric, preferably dihydric, alcohols, phenols, hydrogenation products of these phenols and/or on novolaks (reaction products of mono- or polyhydric phenols with aldehydes, especially formaldehyde, in the presence of acidic catalysts).

Examples of polyhydric phenols which can be mentioned are resorcinol, hydroquinone, 2,2-bis(4-hydroxyphenyl) propane (bisphenol A), isomer mixtures of dihydroxydiphenylmethane (bisphenol F), tetrabromobisphenol A, 4,4'-dihydroxydiphenylcyclohexane, 2,2-bis(4-hydroxy-3-methylphenyl)propane, 4,4'-dihydroxybiphenyl, 4,4'-dihydroxybenzophenone, 1,1-bis(4-hydroxyphenyl)ethane, 2,2-bis[4-(2'-hydroxypropoxy)phenyl]propane, 1,1-bis(4-hydroxyphenyl)isobutane, 2,2-bis(4-hydroxy-3-tert-butylphenyl)propane, bis(2-hydroxynaphthyl)methane, 1,5-dihydroxynaphthalene, tris(4-hydroxyphenyl)methane, bis (4-hydroxyphenyl) ether, bis(4-hydroxyphenyl) sulfone, etc., and also the halogenation and hydrogenation products of the abovementioned compounds. Bisphenol A is particularly preferred in this context.

Examples of polyhydric alcohols as a basis for the corresponding polyglycidyl ethers are ethylene glycol, diethylene glycol, triethylene glycol, polyethylene glycols (n=4 to 35), 1,2-propylene glycol, polypropylene glycols (n=2 to 15), 1,3-propylene glycol, 1,4-butanediol, 1,5-pentanediol, 1,6-hexanediol, 1,2,6-hexanetriol, glycerol, neopentylglycol, trimethylolethane and trimethylolpropane. Polypropylene glycols (n=8 to 10) are particularly preferred in this context.

It is also possible to use polyglycidyl esters of polycarboxylic acids, which are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are diglycidyl adipate, diglycidyl phthalate and diglycidyl hexahydrophthalate.

A detailed listing of appropriate epoxide compounds can be found in the handbook "Epoxidverbindungen und Epoxidharze" [Epoxide Compounds and Epoxy Resins] by A. M. Paquin, Springer Verlag, Berlin 1958, Chapter IV and in Lee, Neville, "Handbook of Epoxy Resins", McGraw-Hill Book Co., 1967, Chapter 2. The above mentioned epoxide compounds can be employed individually or in a mixture.

The emulsifier is preferably prepared by condensation of the abovementioned polyetherpolyols (A) with the epoxide compounds (B) in the presence of an appropriate catalyst or catalysts at from 50 to 200° C., preferably at from 90 to 170° C., the ratio of the number of hydroxyl groups to the number of epoxide groups being from 1:3.6 to 1:10, preferably from 1:4 to 1:9, particularly preferably from 1:4.5 to 1:8, and the specific epoxide group content of the condensation product being from 125 to 6700 mmol/kg, preferably from 1000 to 4000 mmol/kg (epoxide equivalent weight 150 g/mol to 8000 g/mol, preferably 250 g/mol to 1000 g/mol).

Suitable catalysts for the preparation of the dispersant are strong inorganic and organic bases, for example, sodium hydroxide, potassium hydroxide, lithium hydroxide, barium hydroxide, strontium hydroxide, alkali metal alcoholates such as sodium methylate, lithium methylate, sodium ethylate and potassium dodecylate, and the alkali metal salts of carboxylic acids, for example, sodium stearate and lithium stearate. Also suitable are strong inorganic and organic protic acids, for example, phosphoric acid, tetrafluoroboric acid and benzenesulfonic acid. Other catalysts which can be used are Lewis acids. Examples are tin (IV) chloride, titanium (IV) chloride, titanium (IV) isopropylate, triethyloxonium tetrafluoroborate and also boron trifluoride and its complexes with, for example, phosphoric acid, acetic acid (1:1 and 1:2), methanol, diethyl ether, tetrahydrofuran, phenol, ethylene glycol monoethyl ether, polyethylene glycol (e.g., with a molar mass of 200 g/mol), dimethyl sulfoxide, di-n-butyl ether, di-n-hexyl ether, succinic acid and aliphatic, cycloaliphatic, araliphatic amines and nitrogen heterocycles.

Preferred catalysts employed are $BF_3$-diethyl etherate, $BF_3$-amine complexes and aqueous tetrafluoroboric acid. The proportion of catalyst by mass is in general from 0.1 to 5%, preferably from 0.1 to 1%, based on the mass of the reaction mixture. For increased ease of metering, the catalyst can be diluted in a solvent such as diethyl ether, a glycol ether or cyclic ether, ketones and the like.

The emulsifier is prepared by heating the mixtures to be reacted, comprising compounds containing hydroxyl groups and epoxide groups, up to the temperature at which the condensation takes place at a sufficient rate, i.e., in the range of from 30 minutes to 5 hours. The reaction is advantageously monitored by way of the reduction in the epoxide group content. The reaction can be terminated by cooling to below the reaction temperature.

By blending the resulting emulsifiers with liquid epoxy resins according to (B), self-emulsifying liquid-resin systems are obtained which crosslink with the customary, preferably water-dilutable or water-emulsifiable amine hardeners to form films having good properties. This blending is preferably effected at elevated temperature, under reduced pressure if desired, in order to prevent the formation of foam.

Resins which have proven particularly suitable as the liquid epoxy resin component are those based on bisphenol A diglycidyl ethers and bisphenol F diglycidyl ethers (BADGE and BFDGE). The proportionate use of BFDGE increases the chemical resistance and reduces the crystallization tendency, although has adverse effects on chalking and yellowing. The addition of mass fractions of up to 20% of reactive diluents may be sensible in order to exert a favorable influence over viscosity and useful life.

Suitable epoxy resins for the production of epoxy solid-resin dispersions are those described in detail in DE-C 36 43 751 and in DE-A 41 28 487, the disclosure of which is hereby incorporated by reference. It is also possible, by making appropriate additions of the above-described condensation products, to modify finished dispersions in such a way that they indicate the pot life. These dispersions can be prepared in accordance with the teaching of these patents, or, for example, in accordance with the following method.

First the emulsifying component and then the epoxy resin are prepared by condensation of the epoxy compounds and of the polyol components in the presence of the emulsifier at elevated temperatures in the presence of condensation catalysts, then a reactive diluent is added at a lower temperature, followed if desired by a surfactant and if desired by a solvent. Finally, an aqueous dispersion is obtained by portionwise addition of water.

Curing agents suitable for compositions in accordance with this invention, and the curing conditions, are described in the following text. The hardeners are generally employed in quantities such that the number of epoxide groups (EP) and the number of amine hydrogen atoms (H) are in a ratio of from 1:0.75 to 1:2.

Examples of curing agents, preferably for curing at room temperature and/or lower temperatures (amine cold hardeners), are polyalkyleneamines such as diethylenetriamine, triethylenetetramine, tetraethylenepentamine, pentaethylenehexamine, and also 2,2,4- and/or 2,4,4-trimethylhexamethylenediamine, bis(3-aminopropyl)amine, 1,4-bis(3-aminopropyl)piperazine, N,N-bis(3-aminopropyl)ethylenediamine, neopentanediamine, 2-methyl-1,5-pentanediamine, 1,3-diaminopentane, hexamethylenediamine, and also cycloaliphatic amines such as 1,2- and 1,3-diaminocyclohexane, 1,4-diamino-3,6-diethylcyclohexane, 1,2-diamino-4-ethylcyclohexane, 1-cyclohexyl-3,4-diaminocyclohexane, isophoronediamine and reaction products thereof, 4,4'-diaminodicyclohexyl-methane and -propane, bis(4-aminocyclohexyl)-methane and -propane, 3,3'-dimethyl-4,4'-diaminodicyclohexylmethane, 3-amino-1-cyclohexylaminopropane, 1,3- and 1,4-bis(aminomethyl) cyclohexane. Araliphatic amines employed are in particular those including aliphatic amino groups, for example, meta- and para-xylylenediamine or hydrogenation products thereof. The abovementioned amines can be used alone or as mixtures.

Preferred amine hardeners in addition to the abovementioned polyamines are water-soluble polyoxyalkylene di- and poly-amines with a molar mass of from 100 to 2000 g/mol, for example, the products marketed by Texaco under the trade name Jeffamine® and the readily water-dispersible curing agents as described in DE-B 23 32 177 and EP-B 0 000 605, i.e., modified amine adducts, for example.

Other hardeners which can be employed are Mannich bases, epoxy-amine adducts or polyamidoamines.

Suitable Mannich bases are prepared by condensation of polyamines, preferably diethylenetriamine, triethylenetetramine, isophoronediamine, 2,2,4- and 2,4,4-trimethylhexamethylenediamine, 1,3- and 1,4-bis (aminomethyl)cyclohexane, especially meta- and paraxylylenediamine, with aldehydes, preferably formaldehyde, and mono- or polyhydric phenols having at least one ring position which is reactive toward aldehydes, examples being the various cresols and xylenols, para-tert-butylphenol, resorcinol, 4,4'-dihydroxydiphenylmethane, 2,2-bis(4-hydroxyphenyl)propane, but preferably phenol.

Examples of suitable amine-epoxy adducts are reaction products of polyamines, for example ethylenediamine, propylenediamine, hexamethylenediamine, 2,2,4- and 2,4, 4-trimethylhexamethylenediamine, meta-xylylenediamine and/or bis(aminomethyl)cyclohexane with terminal mono- or polyepoxides, such as propylene oxide, hexene oxide or cyclohexene oxide, for example, or with glycidyl ethers such as phenyl glycidyl ether, tert-butyl glycidyl ether, ethylhexyl glycidyl ether, butyl glycidyl ether or with glycidyl esters, such as the glycidyl ester of versatic acid marketed by Shell (Cardura® E) or the polyglycidyl ethers and polyglycidyl esters mentioned under (B).

Polyamidoamines which can be used to cure the novel epoxy resin dispersions are obtained, for example, by reacting polyamines with mono- or polycarboxylic acids, for example, dimerized fatty acids.

corresponding quantity of polyethylene glycol at 125° C. in a nitrogen atmosphere. 1.5 g of a $BF_3$-amine complex (®Anchor 1040 from Air Products) are added as catalyst with thorough stirring and the temperature is raised continuously to 150° C. The specific (based on the mass m of the mixture) epoxide group content n(EP)/m falls during this procedure to somewhat below the theoretical value.

I.2 Emulsifiers based on bisphenol A diglycidyl ether

| Number | $M_w$ (PEG) g/mol | (EP): (OH) | n(EP)/m theor: mmol/kg | EV theor: g/mol | n(EP)/m termination mmol/kg | EV termination g/mol | Temp. termination ° C. | Duration h |
|---|---|---|---|---|---|---|---|---|
| Emu-1 | 4000 | 4.3 | 1181 | 847 | | | 155 | 4 |
| Emu-2 | 6000 | 4.3 | 870 | 1150 | 669 | 1495 | 150 | 2.5 |
| Emu-3 | 8000 | 4.3 | 688 | 1453 | 625 | 1600 | 140 | 4 |
| Emu-4 | 10,000 | 4.3 | 569 | 1756 | 490 | 2040 | 160 | 4 |
| Emu-V | 1000 | 4.3 | 2597 | 385 | 2381 | 420 | 160 | 3 |

PEG: polyethylene glycol
EV: EV value, epoxide equivalent weight, i.e., mass of the substance by the molar quantity of epoxide groups
Emu-V: Comparison example from EP-A 0 618 245 (Example I.4)

In order to achieve more rapid and/or more complete through-curing, the coatings obtainable from the novel epoxy resin dispersions with the abovementioned amine hardeners can also be heated at from 50 to 120° C. for from 15 to 120 minutes.

The novel liquid-resin systems are employed in particular as a protective coating for mineral substrates, i.e., on plaster, concrete, masonry and cement. Examples of areas coated are walls, ceilings and floors in car parking facilities, large-scale kitchens, hospitals, dairies, bathing facilities, tunnels and nuclear power stations. With an appropriate formulation, the novel systems can also be used as anticorrosion primers on steel substrates. Also possible is their use as high-gloss clearcoats for a wide variety of substrates, for example, wood.

Owing to the outstanding technological properties, such as excellent adhesion, very high hardness, good anticorrosion effect, and resistance to water and chemicals, the dispersions obtained in accordance with the invention are suitable, in combination with appropriate curing agents and additives, for the production of finish coatings, intermediate coatings, coating materials, molding compositions and curable compositions for a very wide variety of applications. For example, they can be used to produce protective and/or decorative coatings on a very wide variety of substrates, especially rough and porous substrates such as wood, for example, mineral substrates (e.g., concrete and stone), glass, plastics (e.g., polyethylene, polypropylene, etc.), composite materials, ceramic and pretreated or nonpretreated metals.

The examples which follow are intended to illustrate the invention, without their selection having any restrictive effect:

EXAMPLES

I. Emulsifiers based on polyethylene glycol

I.1 General working procedure:

1 mol of epoxide component (B) (molar quantity of epoxide groups n(EP)=2 mol, diepoxide) is heated with the Formula for theoretical EV value:

$$EV = \frac{M_w(\text{PEG}) + 2 \times 185 \text{ g/mol} \times (\text{EP}):(\text{OH})}{2 \times (z(\text{EP}):z(\text{OH}) - 1)}$$

Formula for theoretical specific epoxide group content (SEG):

$$SEG = \frac{n(\text{EP})}{m} = \frac{2 \times ((\text{EP}):(\text{OH}) - 1}{M_w(\text{PEG}) + 2 \times 185 \text{ g/mol} \times z(\text{EP}):z(\text{OH})}$$

II. Liquid-resin mixtures

The examples which follow show how by adding small quantities of epoxy-functional emulsifiers based on high molar mass polyethylene glycols to a water-dilutable liquid resin according to EP-A 0 618 245 it is possible to obtain systems with pot life indication:

II.1 General formulation 175 g of the diglycidyl ether of bisphenol F, having a specific epoxide group content of from 5710 to 6060 mmol/kg (EV value of from 165 to 175 g/mol, BFDGE, Beckopox SEP 106) and 325 g of the diglycidyl ether of bisphenol A, having a specific epoxide group content of 5405 to 5555 mmol/kg (EV value of from 180 to 185 g/mol, Beckopox EP 140) are homogenized at room temperature. To the homogeneous mixture are added 68.2 g of the emulsifier Emu-V (12% based on the overall mass): comparison sample FlH-V. Mass fractions of 4% of each of the various emulsifiers are added to this mixture. Homogenization is carried out at 70° C. under nitrogen for two hours.

II.2 Liquid resins

| Number | Emulsifier Typ | % | Emulsifier 2 Typ | % | n(EP)/m mmol/kg | EV g/mol | Viscosity mPa.s |
|---|---|---|---|---|---|---|---|
| FIH-1 | Emu-V | 11.25 | Emu-1 | 3.75 | 5051 | 198 | 6500 |
| FIH-2 | Emu-V | 11.25 | Emu-2 | 3.75 | 5051 | 198 | 6400 |
| FIH-3 | Emu-V | 11.25 | Emu-3 | 3.75 | 5102 | 196 | 4800 |
| FIH-4 | Emu-V | 11.25 | Emu-4 | 3.75 | 5076 | 197 | 6400 |
| FIH-V | Emu-V | 12 | — | — | 5128 | 195 | 8500 |

Emulsifier content based on overall mass
FIH-V: Comparison example from EP-A 0 618 245

II.3 Performance testing

In formulating the two-part system, slight excess crosslinking (1.25 mol of crosslinking agent per mole of epoxide groups) is chosen, and the overall mixture is brought to test viscosity with water.

The novel liquid resins exhibit, like the comparison, a short drying time (dust-dry), good water resistance and high initial hardness. Thoroughly good leveling and film in combination with in some cases markedly increased hardness, round off the good profile of properties. However, only those liquid resins with added emulsifiers based on high molar mass polyethylene glycols exhibit a marked rise in viscosity at the end of the useful life.

Explanation of the test conditions:

1. Dust-dry:

Glass beads scattered on the film can no longer be removed with a brush after complete curing.

2. Tack-free:

The glass beads can be removed with a brush after complete curing.

3. König pendulum hardness:

DIN 53 157.

4. Film clouding:

After mixing hardener and dispersion, films with a wet thickness of 200 μm are drawn out every half an hour. The occurrence of cloudiness in the film after complete curing indicates the end of the pot life and is recorded as the test result.

5. Water resistance after 24 h, storage at room temperature:

Films with a wet thickness of 200 μm drawn out on glass plates are tested after storage for 24 h in water at room temperature.

II.3.1 With Beckopox VEH 2133w

This is a reactive hardener based on hydrophillic epoxy-polyamine adducts, 80% in water (Hoechst).

| Liquid resin | | Novel liquid resins | | | | Comparison |
|---|---|---|---|---|---|---|
| | | 1 | 2 | 3 | 4 | V |
| Quantity of 70% strength resin | g | 100 | 100 | 100 | 100 | 100 |
| Quantity of 40% strength hardener | g | 104.6 | 104.6 | 106.5 | 105.1 | 107.3 |
| Pot life | h:min | 1:40 | 1:30 | 1:30 | 1:30 | 1:50 |
| Pot life indication | h:min | 1:40 | 1:30 | 1:30 | 1:30 | none |
| Drying dust-dry | h:min | 2:00 | 2:00 | 1:50 | 1:50 | 3:20 |
| Drying tack-free | h:min | 6:50 | 7:00 | 7:15 | 7:00 | >8 h, <24 h |
| Leveling | * | 0 | 0 | 0 | 0 | 0 |
| Film transparency | * | 0 | 0 | 0 | 0 | 0 |
| Surface task | * | 0 | 0 | 0 | 0 | 0 |
| Pendulum hardness after 1 d | s | 168 | 178 | 187 | 192 | 86 |
| Pendulum hardness after 2 d | s | 191 | 192 | 203 | 212 | 117 |
| Pendulum hardness after 7 d | s | 223 | 224 | 225 | 227 | 167 |
| Water resistance after 24 h | * | 0 | 0 | 0 | 0 | 0–1 |
| Hot water resistance after 7 d | * | 0 | 0 | 0 | 0 | 1–2 |
| Pendulum hardness after storage in water | s | 152 | 170 | 167 | 174 | 98 |
| Pendulum hardness in the vapor space | s | 182 | 179 | 173 | 193 | 84 |
| Emulsion stability | | >3 weeks | >3 weeks | >3 weeks | >3 weeks | <1 week |

*Scale: 0 = excellent to 5 = poor

II.3.2 With Beckopox VEH 2849w

This is a hardener based on hydrophilic epoxy-polyamine aducts, 80% in water (Hoechst)

| Liquid resin | | Novel liquid resins | | | | Comparison |
|---|---|---|---|---|---|---|
| | | 1 | 2 | 3 | 4 | V |
| Quantity of 70% strength resin | g | 100 | 100 | 100 | 100 | 100 |
| Quantity of 40% strength hardener | g | 95.6 | 95.6 | 97.6 | 96.1 | 98.0 |
| Pot life | h:min | 0:50 | 0:50 | 0:40 | 0:40 | 0:40 |
| Pot life indication | h:min | 0:50 | 0:50 | 0:40 | 0:40 | none |
| Drying dust-dry | h:min | 0:30 | 0:30 | 0:30 | 0:30 | 0:30 |
| Drying tack-free | h:min | 6:00 | 6:00 | 6:00 | 6:00 | 6:00 |

-continued

This is a hardener based on hydrophilic epoxy-polyamine aducts, 80% in water (Hoechst)

| Liquid resin | | Novel liquid resins | | | | Comparison |
|---|---|---|---|---|---|---|
| | | 1 | 2 | 3 | 4 | V |
| Leveling | * | 1 | 1 | 1 | 1 | 1 |
| Film transparency | * | 0–1 | 0 | 0–1 | 0–1 | 0–1 |
| Surface task | * | 0 | 0 | 0 | 0 | 0 |
| Pendulum hardness after 1 d | s | 145 | 149 | 138 | 147 | 123 |
| Pendulum hardness after 2 d | s | 178 | 189 | 179 | 177 | 171 |
| Pendulum hardness after 7 d | s | 210 | 215 | 206 | 210 | 212 |
| Water resistance after 24 h | * | 0–1 | 0–1 | 0–1 | 0–1 | 1 |
| Hot water resistance after 7 d | * | 0–1 | 0 | 0–1 | 0–1 | 0–1 |
| Pendulum hardness after storage in water | s | 161 | 174 | 162 | 162 | 117 |
| Pendulum hardness in the vapor space | s | 173 | 182 | 168 | 177 | 170 |

*Scale: 0 = excellent to 5 = poor

II.3.3 With Beckopox EX 623w

This is a hardener based on hydrophilic epoxy-polyamine adducts, 80% in water (Hoechst)

| Liquid resin | | Novel liquid resins | | | | Comparison |
|---|---|---|---|---|---|---|
| | | 1 | 2 | 3 | 4 | V |
| Quantity of 70% strength resin | g | 100 | 100 | 100 | 100 | 100 |
| Quantity of 40% strength hardener | g | 144.3 | 144.3 | 146.8 | 145.0 | 148.0 |
| Pot life | h:min | 4:45 | 4:50 | 4:50 | 4:40 | 3:30 |
| Pot life indication | h:min | weak | 4:50 | weak | weak | none |
| Drying dust-dry | h:min | 6:50 | 6:50 | 8–24 h | 8–24 h | 7:00 |
| Drying tack-free | h:min | 8–24 h | 8–24 h | 8–24 h | 8–24 h | 8–24 h |
| Leveling | * | 1 | 1 | 1 | 1 | 1 |
| Film transparency | * | 0 | 0 | 0 | 0 | 0 |
| Surface task | * | 0 | 0 | 0 | 0 | 0 |
| Pendulum hardness after 1 d | s | 58 | 57 | 49 | 15 | 55 |
| Pendulum hardness after 2 d | s | 101 | 100 | 47 | 45 | 94 |
| Pendulum hardness after 7 d | s | 173 | 179 | 124 | 117 | 184 |
| Water resistance after 24 h | * | 0 | 0 | 3–4 | 4 | 0–1 |
| Hot water resistance after 7 d | * | 0 | 0 | 0–1 | 0–1 | 0 |
| Pendulum hardness after storage in water | s | 119 | 119 | 67 | 65 | 73 |
| Pendulum hardness in the vapor space | s | 83 | 73 | 44 | 39 | 60 |

*Scale: 0 = excellent to 5 = poor

Clearcoats based on the liquid resin 2 and on the comparison with EH 623w were adjusted, in a further test, to spray viscosity (DIN-4: 20 to 40 s flow time) and both the gloss and viscosity were measured as a function of time: In the case of the novel liquid resin 2 there was a trebling in the viscosity until the first observable drop in gloss of the films (after 4 hours); after 24 hours the coating had gelled completely.

However, the comparison falls to about 20% of the original viscosity during the first 3 hours after blending, and then remains at a constant value.

Consequently, the novel liquid resins, even under conditions close to those in practice, show a pot life indication which is comparable with that of conventional systems.

III. Solid-resin dispersions

III.1 Preparation

The preparation is described in detail in the Application EP-A 0 530 602, the disclosure of which is hereby incorporated by reference.

In accordance with this application, the comparison sample produced is the dispersion FHD-V. This dispersion includes a high molar mass emulsifier of bisphenol A diglycidyl ether and polyethylene glycol 4000 (molar mass about 4000 g/mol) without epoxide groups.

A novel dispersion is prepared in exactly the same way, but the abovementioned emulsifier is replaced by the emulsifier Emu-1 (see 1.2). The dispersion thus obtained, FHD-1, has the same solids content by mass (55%), same viscosity (about 1500 mpa.s) and same particle size (about 600 nm) as the comparison sample.

III.2 Performance testing

Hardener: Beckopox ® VEH 2133w from Hoechst.

| | | Novel | Comparison |
|---|---|---|---|
| Solid resin | | FHD-1 | FHD-V |
| Quantity of dispersion | g | 100 | 100 |
| Quantity of 40% strength hardener | g | 33 | 32 |
| Pot life | h:min | 1:50 | 1:40 |
| Pot life indication | h:min | 1:50 | none |
| Drying dust-dry | h:min | 1:00 | 0:40 |
| Drying tack-free | h:min | 5:30 | 5:00 |
| Leveling | * | 0 | 0 |
| Film transparency | * | 0 | 0 |
| Surface tack | * | 0 | 0 |
| Pendulum hardness after 1 d | s | 90 | 101 |
| Pendulum hardness after 2 d | s | 102 | 119 |
| Pendulum hardness after 7 d | s | 132 | 157 |
| Water resistance after 24 h | * | 1–2 | 1–2 |

-continued

Hardener: Beckopox ® VEH 2133w from Hoechst.

|  |  | Novel | Comparison |
|---|---|---|---|
| Pendulum hardness after storage in water | s | 124 | 123 |
| Pendulum hardness in the vapor space | s | 93 | 104 |

Scale: 0 = excellent to 5 = poor

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The entire disclosure of German Patent Application No. 195 36 608.5, filed Sep. 30, 1995, is hereby incorporated by reference.

What is claimed is:

1. An emulsifier composition for water-dilutable epoxy resin compositions, comprising: a condensation product of
   (A) a mixture of aliphatic polyols having a weight-average molar mass (Mw) of from 200 to 20,000 g/mol, wherein the mixture comprises a polyoxyethylene glycol having a Mw of about 1,000 g/mol, and a mass fraction in this mixture of at least 5% comprises aliphatic polyol that has a weight-average molar mass (Mw) of at least 4000 g/mol, and
   (B) an epoxide component comprising at least one epoxide compound having at least two epoxide groups per molecule and an epoxide group content of from 500 to 10,000 mmol/kg,
   the ratio of the number of hydroxyl groups to that of the epoxide groups z(OH):z(EP) being from 1:3.51 to 1:10.

2. An emulsifier composition as claimed in claim 1, wherein a mass fraction of more than 15% of the mixture of polvols (A) has a weight-average molar mass ($M_w$) of at least 4000 g/mol.

3. An emulsifier composition as claimed in claim 1, wherein a mass fraction of more than 25% of the mixture of polyols (A) has a weight-average molar mass ($M_w$) of at least 4000 g/mol.

4. An emulsifier composition as claimed in claim 1, wherein the ratio of the number of hydroxyl groups to that of the epoxide groups z(OH):z(EP) is from 1:4 to 1:8.

5. An emulsifier composition as claimed in claim 1, wherein the mixture of polyols (A) has an OH number of from 5 to 600 mg/g.

6. An emulsifier composition as claimed in claim 1, wherein the mixture of polyols (A) comprises at least one polyoxyalkylene glycol having exclusively terminal primary hydroxyl groups.

7. An emulsifier composition as claimed in claim 1, wherein the mixture of polyols (A) includes a mass fraction of up to 30% of one or more polyesterpolyols of a polycarboxylic acid and a polyhydroxy compound.

8. An emulsifier composition as claimed in claim 7, wherein up to 50% of the mass of the polycarboxylic acid in the polyesterpolyols comprise an aromatic polycarboxylic acid.

9. An emulsifier composition as claimed in claim 1, wherein the mixture of polyols (A) includes a proportion by mass of up to 30% of polycarbonatepolyols, polyamidepolyols or polyesteramidepolyols.

10. An emulsifier composition as claimed in claim 1, wherein the epoxide component (B) has an epoxide group content of from 1000 to 6700 mmol/kg.

11. An emulsifier composition as claimed in claim 1, wherein the epoxide component (B) comprises a polyglycidyl ether of one or more polyhydric alcohols, polyhydric phenols, hydrogenation products of polyhydric phenols or novolaks.

12. An emulsifier composition as claimed in claim 11, wherein the polyhydric phenol is at least one compound selected from the group consisting of resorcinol, hydroquinone, 2,2-bis(4-hydroxyphenyl)propane (bisphenol A), isomer mixtures of dihydroxydiphenylmethane (bisphenol F), tetrabromobisphenol A, 4,4'-dihydroxydiphenylcyclohexane, 2,2-bis(4-hydroxy-3-methylphenyl)propane, 4,4'-dihydroxybiphenyl,4,4'-dihydroxybenzophenone, 1,1-bis(4-hydroxyphenyl)ethane, 2,2-bis[4-(2'-hydroxypropoxy)phenyl]propane, 1,1-bis(4-hydroxyphenyl)isobutane, 2,2-bis(4-hydroxy-3-tert-butylphenyl)propane, bis(2-hydroxynaphthyl)methane, 1,5-dihydroxynaphthalene, tris(4-hydroxyphenyl)methane, bis (4-hydroxyphenyl) ether, bis(4-hydroxyphenyl) sulfone, and halogenation and hydrogenation products thereof.

13. An emulsifier composition as claimed in claim 12, wherein the polyhydric phenol is bisphenol A.

14. An emulsifier composition as claimed in claim 11, wherein the polyhydric alcohol is at least one compound selected from the group consisting of ethylene glycol, diethylene glycol, triethylene glycol, polyethylene glycols having 4 to 35 repeating units, 1,2-propylene glycol, polypropylene glycols having 2 to 15 repeating units, 1,3-propylene glycol, 1,4-butanediol, 1,5-pentanediol, 1,6-hexanediol, 1,2,6-hexanetriol, glycerol, neopentylglycol, trimethylolethane and trimethylolpropane.

15. An emulsifier composition as claimed in claim 14, wherein the polyhydric alcohol is polypropylene glycol having 8 to 10 repeating units.

16. An emulsifier composition as claimed in claim 1, wherein the ratio of the number of hydroxyl groups to that of the epoxide groups z(OH):z(EP) is from 1:3.6 to 1:10.

17. An emulsifier composition as claimed in claim 1, wherein the ratio of the number of hydroxyl groups to that of the epoxide groups z(OH):z(EP) is from 1:4.5 to 1:8.

* * * * *